United States Patent
Blair (10) Patent No.: US 12,091,368 B2
(45) Date of Patent: Sep. 17, 2024

(54) REACTION BARRIER LAYER FOR ENVIRONMENTAL BARRIER COATING

(71) Applicant: Rolls-Royce Corporation, Indianapolis, IN (US)

(72) Inventor: Taylor K. Blair, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 1276 days.

(21) Appl. No.: 16/694,486

(22) Filed: Nov. 25, 2019

(65) Prior Publication Data

US 2020/0172446 A1    Jun. 4, 2020

Related U.S. Application Data

(60) Provisional application No. 62/773,579, filed on Nov. 30, 2018.

(51) Int. Cl.
| | | |
|---|---|---|
| C04B 41/50 | (2006.01) | |
| C04B 41/45 | (2006.01) | |
| C04B 41/52 | (2006.01) | |
| C04B 41/87 | (2006.01) | |
| F02C 7/30 | (2006.01) | |

(52) U.S. Cl.
CPC ...... *C04B 41/5059* (2013.01); *C04B 41/4556* (2013.01); *C04B 41/4558* (2013.01); *C04B 41/522* (2013.01); *C04B 41/524* (2013.01); *C04B 41/87* (2013.01); *F02C 7/30* (2013.01); *F05D 2220/32* (2013.01); *F05D 2230/90* (2013.01); *F05D 2300/30* (2013.01)

(58) Field of Classification Search
None
See application file for complete search history.

(56) References Cited

U.S. PATENT DOCUMENTS

| | | | |
|---|---|---|---|
| 4,476,178 A | 10/1984 | Veltri et al. | |
| 4,952,533 A | * 8/1990 | Hongu | C04B 35/63476 |
| | | | 501/88 |
| 7,300,702 B2 | 11/2007 | Li et al. | |
| 2008/0131665 A1 | * 6/2008 | Suyama | B82Y 30/00 |
| | | | 428/149 |
| 2012/0018074 A1 | * 1/2012 | Ide | C04B 35/563 |
| | | | 156/89.11 |
| 2014/0272431 A1 | * 9/2014 | Chamberlain | C04B 35/65 |
| | | | 156/275.7 |

FOREIGN PATENT DOCUMENTS

WO    2014138108 A1    9/2014

OTHER PUBLICATIONS

Zhu et al., "Environmental Stability and Oxidation Behavior of HfO2—Si and YbGd(O) Based Environmental Barrier Coating Systems for SiC/SiC Ceramic Matrix Composites," 41st International Conference and Expo on Advanced Ceramics and Composites (ICACC'17), Jan. 22-27, 2017, 23 pp.

* cited by examiner

*Primary Examiner* — Alex B Efta
(74) *Attorney, Agent, or Firm* — Shumaker & Sieffert, P.A.

(57) ABSTRACT

A method may include applying a layer comprising a carbon source on a surface of a substrate including silicon; applying a layer comprising silicon on the layer comprising elemental carbon; and heat treating at least the layer comprising the carbon source to cause carbon from the layer comprising the carbon source to react with at least one of silicon from the substrate or silicon from the layer comprising silicon to form silicon carbide.

19 Claims, 4 Drawing Sheets

REACTION BARRIER LAYER FOR ENVIRONMENTAL BARRIER COATING

This application claims the benefit of U.S. Provisional Application Ser. No. 62/773,579, entitled "REACTION BARRIER LAYER FOR ENVIRONMENTAL BARRIER COATING," and filed on Nov. 30, 2018, the entire content of which is incorporated herein by reference.

TECHNICAL FIELD

The disclosure relates to environmental barrier coatings for components used in high temperature environments.

BACKGROUND

The components of gas turbine engines operate in severe environments. For example, the high-pressure turbine airfoils exposed to hot gases in commercial aeronautical engines typically experience surface temperatures of about 1000° C. Components of high-temperature mechanical systems may include a superalloy substrate, a ceramic substrate, or a ceramic matrix composite (CMC) substrate. In many examples, the substrates may be coated with one or more coatings to modify properties of the surface of the substrate. For example, superalloy, ceramic, or CMC substrates may be coated with a thermal barrier coating to reduce heat transfer from the external environment to the substrate, an environmental barrier coating to reduce exposure of the substrate to environmental species, such as oxygen, water vapor, or Calcia-Magnesia-Alumina Silicate (CMAS) containing materials, an abradable coating to improve a seal between the substrate and an adjacent component, or combinations thereof.

SUMMARY

In some examples, the disclosure is directed to a method including applying a layer comprising a carbon source on a surface of a substrate including silicon; applying a layer comprising silicon on the layer comprising the carbon source; and heat treating at least the layer comprising the carbon source to cause carbon from the layer comprising a carbon source to react with at least one of silicon from the substrate or silicon from the layer comprising silicon to form silicon carbide.

In some examples, the disclosure is directed to a method including roughening a surface of a ceramic substrate or a ceramic matrix composite substrate, wherein the ceramic substrate or the ceramic matrix composite substrate comprises silicon; forming a layer comprising elemental carbon on a surface of a ceramic substrate or ceramic matrix composite substrate; forming a layer comprising silicon metal on the layer comprising elemental carbon; applying an environmental barrier coating on the layer comprising silicon; and heat treating the substrate, the layer comprising elemental carbon, the layer comprising silicon metal, and the environmental barrier coating to cause carbon from the layer comprising elemental carbon to react with silicon from the substrate and silicon from the layer comprising silicon to form silicon carbide.

In another example, the disclosure is directed to an article including a ceramic substrate or a ceramic matrix composite substrate comprising silicon; a reaction barrier layer on a surface of the ceramic substrate or a ceramic matrix composite substrate, wherein the reaction barrier layer comprises silicon carbide; a layer comprising elemental carbon on the reaction barrier layer; a bond layer comprising silicon on the layer comprising elemental carbon; and an environmental barrier coating on the bond layer.

The details of one or more examples are set forth in the accompanying drawings and the description below. Other features, objects, and advantages of the disclosure will be apparent from the description and drawings, and from the claims.

DETAILED DESCRIPTION

The disclosure describes coating systems for a ceramic or a ceramic matrix composite (CMC). The coating systems may include a reaction barrier layer, also referred to as a diffusion barrier layer, that includes silicon carbide (SiC). The reaction barrier layer may reduce or substantially prevent diffusion of elements from the ceramic or the CMC to a layer of the coating on the reaction barrier layer, such as a bond layer or environmental barrier coating (EBC) layer. As described above, ceramic or CMC components are useful in a variety of high temperature applications, including, for example, gas turbine engines. Ceramic or CMC components have excellent high temperature mechanical, physical, and chemical properties which allow gas turbine engines to operate at high temperatures. However, one drawback with ceramic or CMC components is their lack of environmental durability in combustion environments, particularly in the presence of water vapor. At high temperatures, water vapor can react with CMC components, e.g., silicon in silicon carbide/silicon carbide (SiC/SiC) CMCs. These reactions cause the components in the outer edge of the CMC to become volatile, resulting in the slow recession of the CMC cross section, thereby diminishing the useful life of the ceramic or CMC.

In some examples, protective coatings such as environmental barrier coatings (EBCs) may be applied to ceramic or CMC components to hinder and slow the ingress of water vapor, thereby increasing the CMC's useful life. The use of a bond layer, such as, for example a bond layer including silicon metal, may provide better adhesion between the CMC and EBC.

Even with the presence of such protective coatings, however, the diffusion of certain molecules, such as oxygen, into the article can still occur. For example, oxygen that diffuses through the EBC can react with the bond layer to form an oxide layer, e.g., silicon dioxide ($SiO_2$), at the interface between the bond layer and the EBC. The growth of the oxide layer may cause deleterious effects including, for example, a thermal expansion mismatch between the bond layer and the EBC, which may result in mechanical stress at the interface and, ultimately, the spallation of the EBC, thereby exposing the ceramic or CMC to water vapor. The growth rate of the oxide layer may be increased due to the diffusion of certain elements in the ceramic or CMC such as, for example, boron, to the bond layer. These elements may catalyze the growth of the oxide layer. Additionally, these deleterious elements can affect the physical structure of the oxide layer, for example transforming $SiO_2$ from an amorphous state to a crystalline structure. Such transformations in the physical structure of the oxide layer may cause embrittlement, thereby increasing the chance of cracking or spallation and decreasing the overall useful life of the ceramic or CMC.

A reaction barrier layer as described herein may reduce or substantially prevent the diffusion of deleterious elements or compounds, such as boron, from the ceramic or CMC substrate to the bond layer of other layers of an EBC, thereby slowing the growth rate of the oxide layer and increasing the useful life of the component. The deleterious elements or compounds may be intentionally included in the ceramic or the CMC, or may be impurities present in the ceramic or the CMC.

The reaction barrier layer may be formed by forming a layer including a carbon source on a surface of the ceramic or the CMC substrate, forming a layer including silicon on the layer including the carbon source, and heating at least the layer including the carbon source to cause carbon from the layer including the carbon source to react with silicon from the ceramic or CMC substrate, silicon from the layer including silicon, or both. In some examples, prior to heating, at least one layer of an EBC may be formed on the layer including silicon. The at least one layer of the EBC may reduce or substantially eliminate oxidation of the layer including silicon during reaction between the carbon and the silicon. The techniques described herein allow formation of a SiC-containing reaction barrier coating without using direct deposition of SiC. Instead, the SiC is formed in situ by reaction between silicon and carbon. This may enable machining of a SiC layer to be omitted from the manufacturing of the article, which may reduce a chance of damage to the SiC layer and article, reduce time and monetary cost of making the article, or both.

Figure 1:
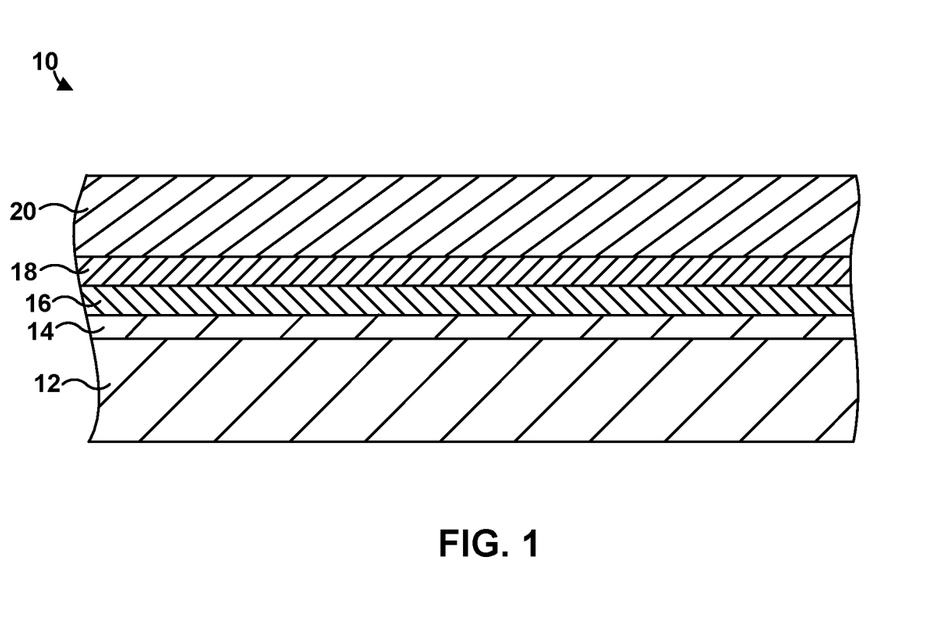
FIG. 1 is a conceptual diagram illustrating an example article including a substrate and an environmental barrier coating including a reaction barrier layer on the substrate.

FIG. 1 is a conceptual illustration of an example article 10 including a substrate 12, a reaction barrier layer 14 on substrate 12, an optional layer 16 on reaction barrier layer 14, a bond layer 18 on optional layer 16, and an EBC 20 on bond layer 18.

Article 10 may be a component of a high temperature mechanical system. For example, article 10 may be a seal segment, a blade track, an airfoil, a blade, a vane, a disk, a blisk, a platform, a combustion chamber liner, or the like, of a gas turbine engine.

Article 10 includes substrate 12. Substrate 12 may include a silicon-containing ceramic or a CMC. Example silicon-containing ceramic materials may include, for example, silicon carbide (SiC), silicon nitride ($Si_3N_4$), aluminosilicate, silica ($SiO_2$), transition metal silicides (e.g., $MoSi_2$, $NbSi_2$, $TiSi_2$), or the like. In some examples, substrate 12 additionally may include silicon metal (e.g., free elemental silicon that is not part of a compound), elemental carbon (free carbon that is not part of a compound), or the like. In some examples, substrate 12 may include mixtures of two or more of SiC, $Si_3N_4$, aluminosilicate, silica, silicon metal, carbon, or the like. In some examples, substrate 12 may include other ceramic materials in addition to the silicon-containing ceramic. For example, substrate 12 may additionally include $Al_2O_3$, transition metal carbides, or the like.

In examples in which substrate 12 includes a CMC, substrate 12 includes a matrix material and a reinforcement material. The matrix material includes a ceramic material, such as, for example, silicon carbide (SiC), silicon nitride ($Si_3N_4$), aluminosilicate, silica ($SiO_2$), transition metal silicides (e.g., $MoSi_2$, $NbSi_2$, $TiSi_2$), or other ceramics described herein. The CMC further includes a continuous or discontinuous reinforcement material. For example, the reinforcement material may include discontinuous whiskers, platelets, fibers, or particulates. As other examples, the reinforcement material may include a continuous monofilament or multifilament weave, braid, unidirectional fibers, or the like. In some examples, the reinforcement material may include SiC, C, other ceramic materials described herein, or the like. In some examples, substrate 12 includes a SiC—SiC CMC. A SiC—SiC CMC may include some residual silicon metal as a result of the techniques used to form SiC—SiC CMCs.

The ceramic or CMC may include other elements, either as intentional inclusions for providing desired properties or as impurities. For example, a CMC may include one or more coatings on the reinforcement material (e.g., fibers) to for an interface between the reinforcement material and the matrix material. The one or more coatings may include elements such as boron. While boron is useful when present as part of an interface coating, the presence of boron in a bond layer or a EBC may be detrimental to the performance of the bond layer or EBC, as described above.

Substrate 12 may be manufactured using one or more techniques including, for example, chemical vapor deposition (CVD), chemical vapor infiltration (CVI), polymer impregnation and pyrolysis (PIP), liquid polymer infiltration (LPI), slurry infiltration, liquid silicon infiltration (LSI), melt infiltration (MI), CVI in combination with slurry infiltration and/or MI, or other techniques.

Article 10 also includes reaction barrier layer 14 on substrate 12. Reaction barrier layer 14 includes silicon carbide (SiC). In some examples, reaction barrier layer 14 may include other materials, such as silicon metal, elemental carbon, or the like, which may be present intentionally or as a result of the manner in which reaction barrier layer 14 is formed.

Reaction barrier layer 14 may be substantially dense. For example, reaction barrier layer 14 may include a porosity of less than about 5 volume percent (vol. %), such as less than about 3 vol. %, less than 2 vol. %, or less than 1 vol. %. Porosity may be measured using optical microscopy, liquid porosimetry, or the like. By being substantially dense, reaction barrier layer 14 may be substantially free (e.g., free or nearly free) of interconnected porosity through which species can diffuse through reaction barrier layer 14 from substrate 12 to bond layer 16 and vice versa.

Reaction barrier layer 14 may define any suitable thickness. The thickness may be selected to be sufficient to reduce or substantially eliminate diffusion of elements or compounds, such as boron, from substrate 12 through reaction barrier layer 14 to bond layer 16 at the temperatures experienced by reaction barrier layer 14 during operation of article 10. In some examples, reaction barrier layer 14 may define a thickness greater than about 1 nanometer, such as greater than about 10 nanometers, or greater than about 100 nanometers, or greater than between about 1 micron, or greater than about 5 microns. In some examples, reaction barrier layer 14 may define a thickness less than about 250 micrometers, such as less than about 125 micrometers, less than about 50 micrometers, or less than about 25 micrometers. In some examples, reaction barrier layer 14 may define a thickness between about 1 nanometer and about 250 micrometers, such as between about 1 nanometer and about 125 micrometers, or between about 1 nanometer and about 50 micrometers, or between about 1 nanometer and about 25 micrometers, or between about 5 micrometers and about 25 micrometers.

In some examples, reaction barrier layer 14 may include other constituents in addition to silicon carbide. The additional constituents may be intentional inclusions to the layer or may form as a result of the technique used to form reaction barrier layer 14 or due to diffusion of species into reaction barrier layer 14. For example, reaction barrier layer 14 may include silicon metal (e.g., free elemental silicon not present as SiC or another silicon-containing compound), elemental carbon (e.g., free elemental carbon not present as SiC or another carbon-containing compound), or both due to the technique sued to form reaction barrier layer 14. As another example, reaction barrier layer 14 may include boron, boron carbide, or the like, due to diffusion of boron from substrate 12 into reaction barrier layer 14.

Article 10 may optionally include layer 16 on reaction barrier layer 14. Layer 16 includes carbon. The carbon may be elemental carbon, e.g., free elemental carbon not present in a carbon-containing compound. Layer 16 may be a remnant of a layer including elemental carbon formed on substrate 12 as part of forming reaction barrier layer 14. When present, carbon from layer 16 may react with impurities, if any, that diffuse from reaction barrier layer 14 (e.g., if boron diffuse through reaction barrier layer 14) or from bond layer 18 or EBC 20.

Layer 16 may define any suitable thickness. The thickness of layer 16 may be a result of the thickness of the initial layer including elemental carbon formed on substrate 12 and the amount of carbon from the initial layer including elemental carbon that has reacted with silicon to form silicon carbide in reaction barrier layer 14. In some examples, layer 16 may define a thickness greater than about 1 nanometer, such as greater than about 10 nanometers, or greater than about 100 nanometers, or greater than between about 1 micron, or greater than about 5 microns. In some examples, layer 16 may define a thickness less than about 250 micrometers, such as less than about 125 micrometers, less than about 50 micrometers, or less than about 25 micrometers. In some implementations, layer 16 may define a thickness between about 1 nanometer and about 250 micrometers, such as between about 1 nanometer and about 125 micrometers, or between about 1 nanometer and about 50 micrometers, or between about 1 nanometer and about 25 micrometers, or between about 5 micrometers and about 25 micrometers.

In some examples, article 10 may omit layer 16, e.g., in examples in which substantially all the carbon from the initial layer including elemental carbon has reacted with silicon to form silicon carbide in reaction barrier layer 14, diffused into adjacent layers 18, 20, or 14, or reacted with other migrating species.

In some examples, although not shown in FIG. 1, article 10 additionally may include a second reaction barrier layer on layer 16 (in examples in which article 10 includes layer 16). The second reaction barrier layer may be similar to or substantially the same as reaction barrier layer 14 and be formed from reaction of carbon from layer 16 and silicon from bond layer 18. Alternatively, reaction barrier layer 14 may be on layer 16 (between layer 16 and bond layer 18).

Article 10 also includes bond layer 18 on reaction barrier layer 14 (or layer 16 in examples in which layer 16 is present). Bond layer 18 may include silicon metal (e.g., free elemental silicon not present in combination with another element in a silicon-containing compound), alone, or mixed with at least one other constituent. For example, bond layer 16 may include silicon metal and at least one of a transition metal carbide, a transition metal boride, a transition metal nitride, mullite (aluminum silicate, $Al_6Si_2O_{13}$), silica, a silicide, an oxide (e.g., a rare earth oxide, an alkali oxide, or the like), a silicate (e.g., a rare earth silicate or the like), or the like. In some examples, the additional constituent(s) may be substantially homogeneously mixed with silicon metal. In other examples, the additional constituent(s) may form one or more additional phases distinct from the silicon metal phase.

By including reaction barrier layer 14 between substrate 12 and bond layer 16, diffusion of elements or compounds from substrate 12 to bond layer 18, and vice versa, may be reduced. For example, substrate 12 may include boron or other elements or compounds that may detrimentally affect bond layer 18, EBC 20, or both. For example, if present in bond layer 18, boron may accelerate oxidation of bond layer 18, may change physical or chemical properties of bond layer 18, or may otherwise detrimentally affect bond layer 18. As another layer, an element or compound from substrate 12 that diffuses into EBC 20 may form a low melting point phase in EBC 20. Reaction barrier layer 14 may reduce or substantially eliminate diffusion of boron or other elements or compounds from substrate 12 to bond layer 18, reducing the effects of these elements or compounds on bond layer 18. In this way, reaction barrier layer 14 may improve a useful life of bond layer 18 and article 10 compared to an article that does not include reaction barrier layer 14.

Article 10 may include one or more additional layers on bond layer 18. For example, article 10 may include an EBC 20 on bond layer 18. EBC 20 may include one or more layers. In such configurations, bond layer 18 may act to improve the adhesion, CTE compatibility, or both between EBC 20 and substrate 12. In some examples, EBC 20 may include a single layer that performs multiple functions. For example, EBC 20 may act as both an environmental barrier and an abradable coating. In other examples, EBC 20 may include multiple layers, each layer configured to perform one or more functions. For example, EBC 20 may include separate environmental barrier and abradable layers.

EBC 20 may include constituents and a physical construction selected to reduce contact of underlying layers with chemical species present in the environment in which article 10 is used, such as water vapor, calcia-magnesia-alumina-silicate (CMAS; a contaminant that may be present in intake gases of gas turbine engines), or the like. EBC 20 may include at least one of a rare earth oxide, a rare earth silicate, an aluminosilicate, or an alkaline earth aluminosilicate. For example, EBC 20 may include at least one rare earth monosilicate ($RE_2SiO_5$, where RE is a rare earth element), at least one rare earth disilicate ($RE_2Si_2O_7$, where RE is a rare earth element), or combinations thereof. In some examples, EBC 20 may include ytterbia monosilicate, ytterbia disilicate, or combinations thereof. In some examples, EBC 20 may include an additive in addition to the primary constituents of EBC 20. For example, EBC 20 may include at least one of $TiO_2$, $Ta_2O_5$, $HfSiO_4$, alumina ($Al_2O_3$), an alkali metal oxide, or an alkali earth metal oxide. The additive may be added to EBC 20 to modify one or more desired properties of EBC 20. For example, the additive components may increase or decrease the reaction rate of EBC 20 with calcia-magnesia-alumina-silicate (CMAS; a contaminant that may be present in intake gases of gas turbine engines), may modify the viscosity of the reaction product from the reaction of CMAS and constituent(s) of EBC 20, may increase adhesion of EBC 20 to bond layer 18, may increase or decrease the chemical stability of EBC 20, or the like. In some examples, EBC 20 may be or include a substantially non-porous layer (e.g., may include a porosity of less than about 5 volume percent).

In some examples, EBC 20 includes an outer abradable layer, alone or in addition to an underlying environmental barrier layer. The abradable layer may include constituents and a physical construction so that the abradable layer is configured to abrade or break in a controlled manner when exposed to mechanical forces of sufficient force. In some examples, the abradable layer may include at least one of a rare earth oxide, a rare earth silicate, an aluminosilicate, or an alkaline earth aluminosilicate. The abradable layer may be porous. Porosity of the abradable layer may reduce thermal conductivity of the abradable layer and/or may affect the abradability of the abradable layer. In some examples, the abradable layer includes porosity between about 5 vol. % and about 50 vol. %. In other examples, the abradable layer includes porosity between about 15 vol. % and about 35 vol. %, or about 20 vol. %.

Porosity of the abradable layer is defined herein as a volume of pores or cracks in the abradable layer divided by a total volume of the abradable layer (including both the volume of material in the abradable layer and the volume of pores/cracks in the abradable layer). The porosity of the abradable layer may be controlled by the use of coating material additives and/or processing techniques to create the desired porosity. In some examples, substantially closed pores may be desired. For example, a coating material additive that melts or burns at the use temperatures of the component (e.g., a blade track) may be incorporated into the coating material that forms the abradable layer. The coating material additive may include, for example, graphite, hexagonal boron nitride, or a polymer such as a polyester, and may be incorporated into the coating material prior to deposition of the coating material over substrate 12 to form the abradable layer. The coating material additive then may be melted or burned off in a post-formation heat treatment, or during operation of the gas turbine engine, to form pores in the abradable layer. The post-deposition heat-treatment may be performed at up to about 1500° C.

Bond layer 18 and the layer or layers of EBC 20 may be applied using a variety of techniques including, for example, thermal spraying (e.g., plasma spraying), PVD, electron beam physical vapor deposition (EB-PVD), directed vapor deposition (DVD), CVD, cathodic arc deposition slurry process deposition, sol-gel process deposition, or electrophoretic deposition.

Figure 2:
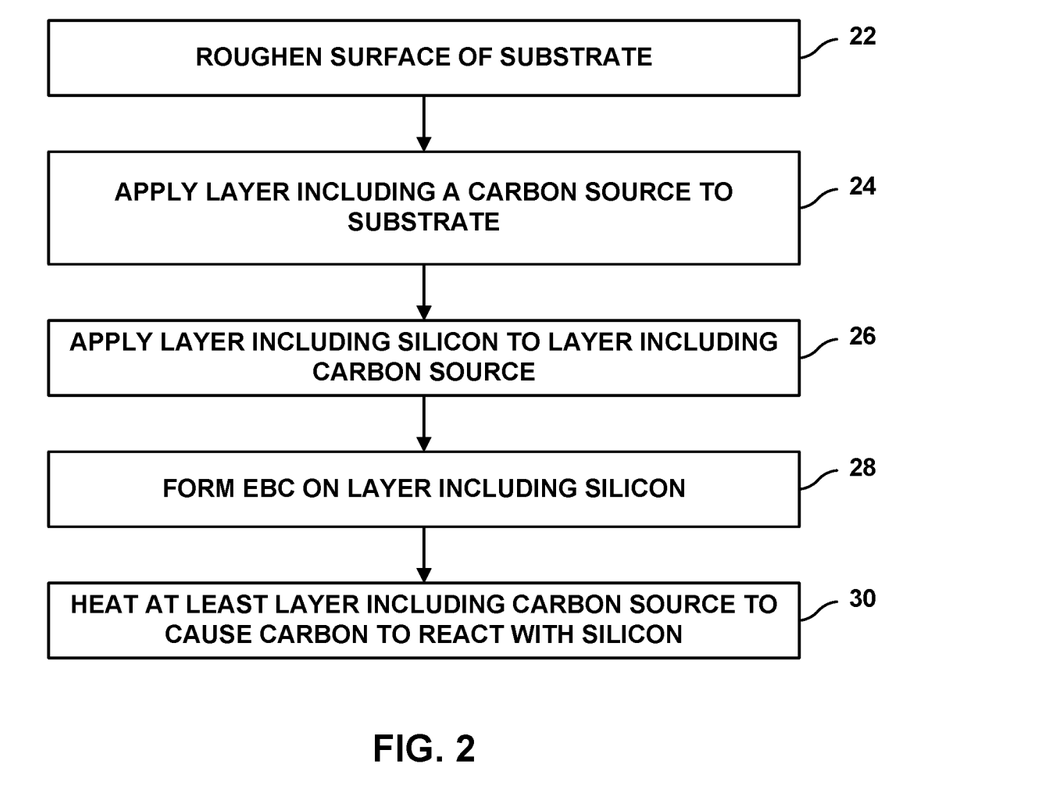
FIG. 2 is a flow diagram illustrating an example technique for forming an environmental barrier coating including a reaction barrier layer.

Reaction barrier layer 14 may be formed in situ by application of a layer including a carbon source, such as elemental carbon, to substrate 12, formation of a layer including silicon on the layer including the carbon source, and heat treatment of at least the layer of including the carbon source to cause carbon from the carbon source to react with silicon in the layer including silicon, substrate 12, or both, to form silicon carbide. FIG. 2 is a flow diagram illustrating an example technique for forming an environmental barrier coating including a reaction barrier layer. The technique of FIG. 2 will be described with concurrent reference to FIGS. 3-5.

The technique of FIG. 2 optionally includes roughening surface 42 of substrate 12 (22). Surface 42 may be roughened mechanically, chemically, electrochemically, or the like. For example, surface 42 may be grit blasted, grinded, laser ablated, etched, or the like. Roughening surface 42 may increase adhesion of subsequent layers to surface 42.

A layer including a carbon source 44 may be applied to surface 42 of substrate 12 (24). The layer including a carbon source 44 may include any form of carbon or carbon source that may provide carbon capable of reacting with silicon, when heated, to form silicon carbide. For example, the layer including a carbon source 44 may include elemental carbon (free carbon that is not part of a compound). Elemental carbon may be in any suitable allotrope, including, for example, amorphous carbon, graphite, crystalline carbon, or the like. In some examples, the layer including a carbon source 44 may consist essentially of or consist of amorphous carbon. While not wishing to be bound by theory, it is currently believed that amorphous carbon may more readily react with silicon from substrate 12 and or a layer on layer 44 to form silicon carbide.

In other examples, the layer including a carbon source 44 may include a carbon source other than elemental carbon, such as soot from burning a hydrocarbon in a lean atmosphere, a carbon-containing polymer or compound, or the like. In general, the layer including a carbon source 44 may include carbon or a carbon source from tapes, drawing, films or sheets, gaseous or liquid precursors, slurry deposition, or the like.

In some examples, the layer including a carbon source 44 may include a binder, a catalyst, or both. Suitable binders include, for example, an epoxy, a polyester, or the like. In some examples, the binder also functions as a source of carbon, e.g., the binder may be pyrolyzed to release carbon. Suitable catalysts include, for example, aluminum, alumina, yttria, silicon carbide, or the like. The catalyst may be present in the layer including a carbon source 44 as particles.

The layer including a carbon source 44 may be applied to surface 42 of substrate 12 using any suitable technique including, for example, placement of a film or sheet of carbon on surface 42, sputtering or another physical vapor deposition process, a chemical vapor deposition process, dip coating, spin coating, spraying, or the like.

The layer including a carbon source 44 may include a thickness selected to provide sufficient carbon to react with silicon from substrate 12 and/or a layer including silicon on the layer including a carbon source 44 and form a reaction barrier layer having a selected thickness. In some examples, the thickness of the layer including a carbon source 44 may be selected to be sufficiently thick so that excess carbon is present and a layer including carbon remains after completion of the heat treatment that causes the reaction between carbon from the layer including a carbon source 44 and silicon from an adjacent layer. In some examples, the layer including a carbon source 44 may define a thickness between about 1 nanometer and about 250 micrometers, such as between about 1 nanometer and about 125 micrometers, or between about 1 nanometer and about 50 micrometers, or between about 1 nanometer and about 25 micrometers.

Figure 3:
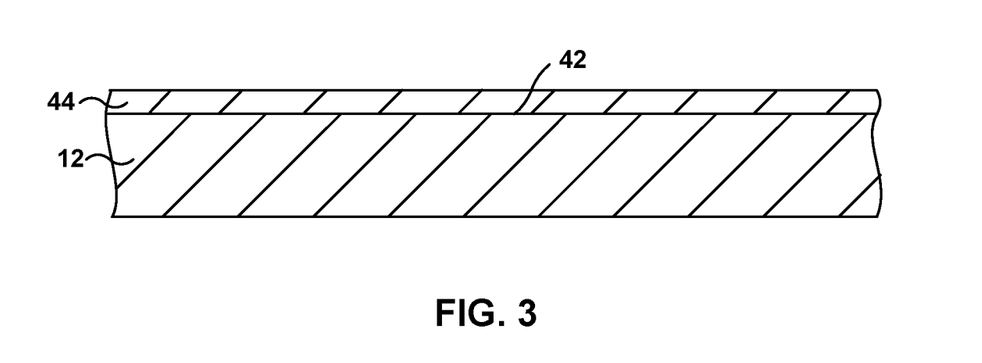
FIGS. 3-5 are conceptual diagrams illustrating an example article at various steps of the technique of FIG. 2.

In some examples, the layer including a carbon source 44 may be substantially dense. For example, the layer including a carbon source 44 may include a porosity of less than about 5 volume percent (vol. %), such as less than about 3 vol. %, less than 2 vol. %, or less than 1 vol. %. Porosity may be measured using optical microscopy, liquid porosimetry, or the like. By being substantially dense, the layer including a carbon source 44 may be substantially free (e.g., free or nearly free) of interconnected porosity through which species can diffuse through any remnants of the layer including a carbon source 44. In other examples, the layer including a carbon source 44 may include porosity to aid the reaction, control stress in the layer including a carbon source 44, or the resultant barrier layer FIG. 3 is a conceptual diagram illustrating substrate 12 with the layer including a carbon source 44 applied on surface 42.

The technique of FIG. 2 also includes applying a layer including silicon 46 to the layer including a carbon source 44 (26). The layer including silicon 46 may include silicon metal, a silicon alloy, or the like, and, optionally, one or more additives. For example, the layer including silicon 46 may include any of the compositions described above with respect to bond layer 18.

Figure 4:
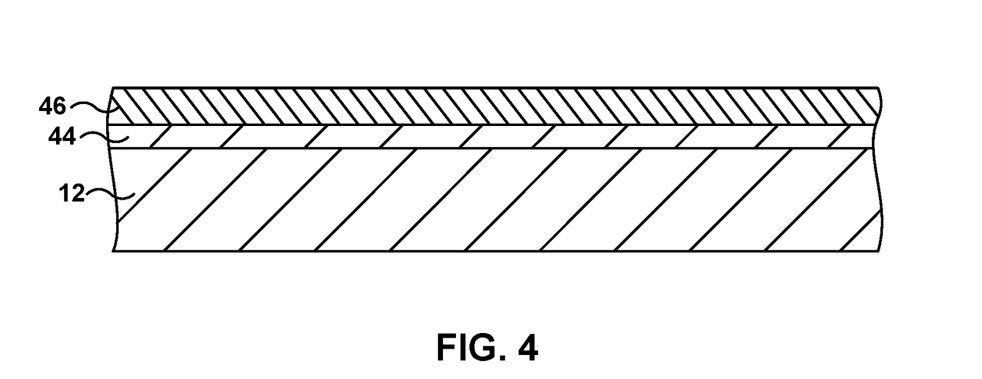

The layer including silicon 46 may be applied using any suitable technique, including thermal spraying, such as air plasma spraying. The layer including silicon 46 may be deposited to any suitable thickness. For example, the thickness of the layer including silicon 46 may be selected such that the reaction of all of the carbon from the layer including the carbon source 44 with silicon from the layer including silicon 46 would not consume all of the silicon from the layer including silicon 46. In one example layer including silicon 46 may be at least 1.8 times the thickness of the layer including the carbon source 44 or at least 3.5 times the thickness of the layer including the carbon source 44. FIG. 4 is a conceptual diagram illustrating substrate 12 with the layer including a carbon source 44 applied on surface 42 and the layer including silicon 46 applied on the layer including a carbon source 44.

Figure 5:
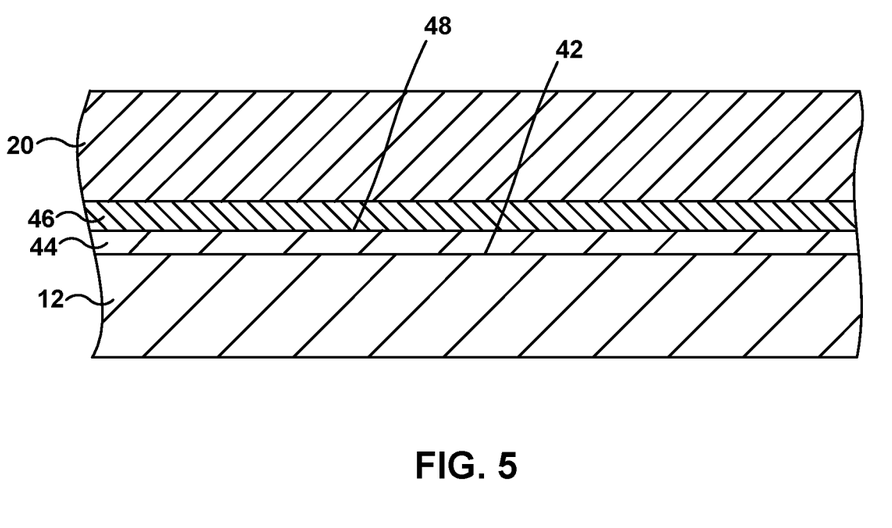

The technique of FIG. 2 optionally includes forming EBC 20 on the layer including silicon 46 (28). EBC 20 may be formed using any suitable process or combination of processes (e.g., when EBC 20 includes more than one layer), including, for example, thermal spraying (e.g., plasma spraying), PVD, electron beam physical vapor deposition (EB-PVD), directed vapor deposition (DVD), CVD, cathodic arc deposition, slurry process deposition, sol-gel process deposition, or electrophoretic deposition. In some examples, EBC 20 may be deposited before heating at least the layer including a carbon source 44 (30), as shown in FIG. 2. In other examples, EBC 20 may be deposited after heating at least the layer including a carbon source 44 (30). FIG. 5 is a conceptual diagram illustrating substrate 12 with the layer including a carbon source 44 applied on surface 42, the layer including silicon 46 applied on the layer including a carbon source 44, and EBC 20 on the layer including silicon 46.

The technique of FIG. 2 also includes heating at least the layer including a carbon source 44 to cause carbon from the layer including a carbon source 44 to react with silicon from substrate 12 and/or the layer including silicon 46 (30). For example, substrate 12, the layer including a carbon source 44, the layer including silicon, and, if present, EBC 20 may be placed in a furnace or retort and heated. In some examples, the heat treatment may be at a temperature between about 800° C. and about 1414° C., for a duration between about 10 minutes and about 100 hours.

In some examples, such as examples in which EBC 20 is not present during the heat treatment, the heat treatment may be performed in an atmosphere that is inert to silicon, carbon, or both to reduce or substantially avoid oxidizing silicon from the layer including silicon 46 or oxidizing carbon from carbon source 44. For example, the heat treatment may be performed in an argon atmosphere, a vacuum, or the like.

As the heat treatment proceeds, carbon from the layer including a carbon source 44 may react with silicon from the layer including silicon 46, silicon from substrate 12, or both, to form silicon carbide. The reaction between carbon from the layer including a carbon source 44 and silicon from substrate 12 may occur at or near surface 42 (an interface between the layer including a carbon source 44 and substrate 12). The reaction between carbon from the layer including a carbon source 44 and silicon from the layer including silicon 46 may occur at or near interface 48 between the layer including a carbon source 44 and the layer including silicon 46. The heat treatment may be continued for a time calculated to result in a reaction barrier layer (e.g., reaction barrier layer 14 shown in FIG. 1) having a desired thickness.

As described above, in some examples, the heat treatment temperature, heat treatment time, and thickness of the layer including a carbon source 44 may be selected such that substantially all carbon from the layer including a carbon source 44 reacts with silicon from substrate 12 and/or the layer including silicon 46 and the layer including a carbon source 44 is no longer present after the heat treatment. In other examples, the heat treatment temperature, heat treatment time, and thickness of the layer including a carbon source 44 may be selected such that less than all carbon from the layer including a carbon source 44 reacts with silicon from substrate 12 and/or the layer including silicon 46 and a layer including carbon (e.g., layer 16 shown in FIG. 1) is present after the heat treatment. In some examples, layer 16 may be between two layers that include silicon carbide. By reacting with silicon metal present near surface 42 of substrate, the layer including a carbon source 44 may reduce an amount of silicon metal present near surface 42, which may improve properties of substrate 12 and article 10.

Various examples have been described. These and other examples are within the scope of the following claims.

What is claimed is:

1. A method comprising:
   applying a layer comprising a carbon source on a surface of a substrate including silicon;
   applying a layer comprising silicon on the layer comprising the carbon source, wherein the layer comprising silicon is adjacent to the layer comprising the carbon source;
   applying an environmental barrier coating on the layer comprising silicon, wherein the layer comprising silicon is between the substrate including silicon and the environmental barrier coating; and
   heat treating at least the layer comprising the carbon source to cause carbon from the layer comprising the carbon source to react with at least one of silicon from the substrate or silicon from the layer comprising silicon to form silicon carbide.

2. The method of claim 1, wherein heat treating at least the layer comprising the carbon source comprises heat treating the substrate, the layer comprising the carbon source, and the layer comprising silicon in an atmosphere that is inert to silicon and carbon.

3. The method of claim 1, further comprising roughening a surface of the substrate prior to forming the layer comprising the carbon source.

4. The method of claim 1, wherein heat treating at least the layer comprising the carbon source causes carbon from the layer comprising the carbon source to react with silicon from the substrate at or near an interface between the layer comprising the carbon source and the substrate.

5. The method of claim 1, wherein heat treating at least the layer comprising the carbon source causes carbon from the layer comprising the carbon source to react with silicon from the layer comprising silicon at or near an interface between the layer comprising the carbon source and the layer comprising silicon.

6. The method of claim 1, wherein heat treating at least the layer comprising the carbon source causes carbon from the layer comprising the carbon source to react with silicon from the substrate at or near a first interface between the layer comprising the carbon source and the substrate and to react with silicon from the layer comprising silicon at or near a second interface between the layer comprising the carbon source and the layer comprising silicon.

7. The method of claim 1, wherein the layer comprising the carbon source comprises an allotrope of carbon.

8. The method of claim 1, wherein the layer comprising the carbon source comprises elemental amorphous carbon.

9. The method of claim 1, wherein the layer comprising the carbon source and a porosity level of the layer comprising silicon comprise porosity sufficient to control stress from the formation of silicon carbide.

10. The method of claim 1, wherein a thickness of the layer comprising the carbon source and a time and temperature of the heat treatment step is selected such that substantially all of the carbon from the layer comprising the carbon source reacts with silicon to form silicon carbide.

11. The method of claim 1, wherein a thickness of the layer comprising the carbon source and a time and temperature of the heat treatment step is selected such that less than all of the carbon from the layer comprising the carbon source reacts with silicon to form silicon carbide such that a portion of the layer comprising the carbon source remains after the heat treatment step.

12. The method of claim 1, wherein a thickness of the layer comprising the carbon source is between about 1 nm and about 250 micrometers.

13. The method of claim 12, wherein the thickness of the layer comprising the carbon source is between about 5 micrometers and about 25 micrometers.

14. The method of claim 1, wherein forming the layer comprising silicon comprises thermal spraying the layer comprising silicon on the layer comprising the carbon source.

15. The method of claim 1, wherein forming the layer comprising the carbon source comprises at least one of sputtering carbon on the substrate, positioning a carbon film on the substrate, burning a hydrocarbon in a lean atmosphere, or depositing carbon-containing polymer coating on the substrate.

16. A method comprising:
roughening a surface of a ceramic substrate or a ceramic matrix composite substrate, wherein the ceramic substrate or the ceramic matrix composite substrate comprises silicon;
forming a layer comprising elemental carbon on a surface of the ceramic substrate or ceramic matrix composite substrate;
forming a layer comprising silicon metal on the layer comprising elemental carbon;
forming an environmental barrier coating on the layer comprising silicon, wherein the layer comprising silicon is between the substrate and the environmental barrier coating; and
heat treating the substrate, the layer comprising elemental carbon, the layer comprising silicon metal, and the environmental barrier coating to cause carbon from the layer comprising elemental carbon to react with silicon from the substrate and silicon from the layer comprising silicon to form silicon carbide.

17. The method of claim 16, wherein the layer comprising elemental carbon comprises an allotrope of carbon.

18. The method of claim 16, wherein the layer comprising elemental carbon comprises amorphous carbon.

19. An article comprising:
a ceramic substrate or ceramic matrix composite substrate comprising silicon;
a reaction barrier layer adjacent to a surface of the ceramic substrate or a ceramic matrix composite substrate, wherein the reaction barrier layer comprises silicon carbide;
a layer comprising elemental carbon adjacent to the reaction barrier layer;
a bond layer comprising silicon adjacent to the layer comprising elemental carbon; and
an environmental barrier coating adjacent to the bond layer comprising silicon, wherein the bond layer comprising silicon, the layer comprising elemental carbon, and the reaction barrier layer are between the substrate and the environmental barrier coating.

* * * * *